US006638340B1

(12) United States Patent
Kanazirev et al.

(10) Patent No.: US 6,638,340 B1
(45) Date of Patent: Oct. 28, 2003

(54) COMPOSITE ADSORBENTS FOR AIR PURIFICATION

(75) Inventors: Vladislav I. Kanazirev, Arlington Heights, IL (US); Donald G. Latus, Elgin, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/108,693

(22) Filed: Mar. 27, 2002

(51) Int. Cl.$^7$ .................... B01D 53/047; B01D 53/28
(52) U.S. Cl. ............... 95/96; 95/106; 95/117; 95/135; 95/136; 95/138; 95/139; 95/140
(58) Field of Search ............. 95/96–106, 117–119, 95/135, 136, 138–140, 143, 145, 900, 902

(56) References Cited

U.S. PATENT DOCUMENTS

| | | | |
|---|---|---|---|
| 2,882,244 A | 4/1959 | Milton ................ 252/455 |
| 2,915,365 A | 12/1959 | Saussol ................ 23/142 |
| 3,025,233 A * | 3/1962 | Figert ................ 210/502.1 |
| 3,130,007 A | 4/1964 | Breck ................ 23/113 |
| 3,557,025 A | 1/1971 | Emerson et al. ........ 252/463 |
| 3,862,900 A | 1/1975 | Reusser ................ 208/262 |
| 3,899,310 A * | 8/1975 | Chi et al. ............ 95/141 |
| 4,194,892 A | 3/1980 | Jones et al. ........... 55/58 |
| 4,249,915 A | 2/1981 | Sircar et al. .......... 55/26 |
| 4,259,299 A * | 3/1981 | Hagiwara et al. ....... 423/219 |
| 4,433,981 A | 2/1984 | Slaugh et al. ......... 55/59 |
| 4,477,264 A | 10/1984 | Kratz et al. .......... 55/25 |
| 4,493,715 A | 1/1985 | Hogan et al. .......... 55/68 |
| 4,499,208 A | 2/1985 | Fuderer ............... 502/415 |
| 4,503,023 A | 3/1985 | Breck et al. .......... 423/328 |
| 4,762,537 A * | 8/1988 | Fleming et al. ........ 95/132 |
| 5,232,474 A | 8/1993 | Jain .................. 55/26 |
| 5,779,767 A | 7/1998 | Golden et al. ......... 95/96 |
| 5,919,286 A * | 7/1999 | Golden et al. ......... 95/98 |
| 6,027,548 A | 2/2000 | Ackley et al. ......... 95/96 |
| 6,106,593 A * | 8/2000 | Golden et al. ......... 95/120 |
| 6,350,298 B1 * | 2/2002 | Su et al. ............. 95/96 |
| 6,358,302 B1 * | 3/2002 | Deng et al. ........... 95/96 |
| 6,379,430 B1 * | 4/2002 | Monereau ............. 95/96 |
| 6,402,809 B1 * | 6/2002 | Monereau et al. ...... 95/14 |
| 6,432,171 B1 * | 8/2002 | Kumar et al. ......... 95/120 |
| 6,436,173 B1 * | 8/2002 | Jale et al. ........... 95/130 |
| 6,444,012 B1 * | 9/2002 | Dolan et al. .......... 95/99 |

FOREIGN PATENT DOCUMENTS

| | | |
|---|---|---|
| DE | 30 45 451 A1 | 7/1981 |
| EP | 0 325 392 B1 | 10/1992 |

* cited by examiner

Primary Examiner—Robert H. Spitzer
(74) Attorney, Agent, or Firm—John G. Tolomei; Mark Goldberg

(57) ABSTRACT

Applicant has developed an improved adsorbent useful in removing contaminants from various air streams. The adsorbent contains a zeolite, an alumina and a metal component. The metal component is present in an amount at least 10 mol-% of the stoichiometric amount of metal (expressed as the oxide) needed to balance the negative charge of the zeolite lattice. In a specific application an adsorbent comprising zeolite X, alumina and sodium is used to purify an air stream in order to remove water, carbon dioxide and other impurities including hydrocarbons.

10 Claims, No Drawings

COMPOSITE ADSORBENTS FOR AIR PURIFICATION

FIELD OF THE INVENTION

This invention relates to the removal of carbon dioxide and other contaminants from gas streams, and more particularly to the pre-purification of air by the removal of contaminants from air prior to air separation. More specifically, the invention relates to adsorbents, having at least three components, that provide enhanced performance in the pre-purification of air.

BACKGROUND OF THE INVENTION

Gases that occur in nature or which are produced in industrial processes often contain carbon dioxide in small amounts. Atmospheric air generally contains about 0.035% or 350 parts per million (ppm) carbon dioxide. It is sometimes desirable or necessary to remove the carbon dioxide from a gas because of certain process constraints or the intended end use for the gas. For example, air that is separated into various component products by cryogenic separation techniques (cryogenic air separation), such as cryogenic distillation or cryogenic adsorption, must be substantially free of both carbon dioxide and moisture. These operations are carried out at temperatures below the freezing points of water and carbon dioxide and consequently, if they are not removed, they will freeze and eventually clog the air separation process equipment.

Relatively pure oxygen (i.e. an oxygen-containing gas having an oxygen content of 88% or more) has a number of desirable industrial and medicinal applications at various pressures and purities. The Earth's atmosphere, typically comprising nearly twenty-one percent oxygen gas, is the natural candidate for use as an economical oxygen source. Many of the most practical and economical oxygen production plants employ air separation systems and methods.

One of the more common systems for producing oxygen in relatively large volumes incorporates cryogenic technology to liquefy and separate a desired oxygen component of a predetermined purity from the air mixture. While the design works well for high-volume oxygen production, the specialized cryogenic hardware and associated high capital startup expenditures make such systems cost-prohibitive when used for production in low to moderate volumes, e.g. from about 30 to about 200 tons per day of an oxygen containing gas with an oxygen concentration higher than about 88% and up to about 95%.

Traditionally, higher volumes of oxygen have been produced via the well-known cryogenic rectification of air in which air is cooled to a temperature near the normal boiling point of the components and treated in fractionation columns. The significant capital and operating costs of the cryogenic separation systems are justified only when large quantities and/or extremely high purities (such as 97% to 99.999%) are required.

Before air can be introduced into a cryogenic air separation process in which oxygen and nitrogen are separated from one another, $CO_2$ in the air at low levels must be removed in order to avoid the $CO_2$ solidifying in the components of the air separation plant. Two methods generally used for such $CO_2$ removal include temperature swing adsorption (TSA) and pressure swing adsorption (PSA).

In each of these techniques, a bed of adsorbent is exposed to a flow of feed air for a period of time to adsorb $CO_2$ from the air. Thereafter, the flow of feed air is shut off from the adsorbent bed and the adsorbent is exposed to a flow of purge gas which strips the adsorbed $CO_2$ from the adsorbent and regenerates it for further use. In TSA processes, the $CO_2$ is driven off from the adsorbent by heating the adsorbent in the regeneration phase. In PSA processes, the pressure of the purge gas is lower than that of the feed gas and the change in pressure is used to remove the $CO_2$ from the adsorbent.

Other components can be removed from the feed air by these processes, including hydrocarbons and water. These adsorption techniques can also be applied to feed gases other than air or be applied to air to be purified for purposes other than use in an air separation plant.

The choice of adsorbent is often the key to the effectiveness of the process. Much attention has been given to the development, improvement and manufacture of adsorbents, e.g. specialized zeolite adsorbents that have been synthesized through ion exchange, lower Si/Al containing structures and improved activation procedures. These additional and/or improved manufacturing steps have resulted in higher costs for these specialized adsorbents compared to standard adsorbents, e.g. LiX compared to 5A and 13X adsorbents in PSA air separation processes. In many processes the adsorbent has become a significant fraction of the overall capital investment. Thus, there is considerable incentive to reduce the cost of the adsorbent if such reduction can be transformed into an overall reduction in the cost of the desired product of the separation.

The prior art has attempted to address the problem of thermal cycling in PSA processes, in some instances by employing mixtures of materials. Mixtures have also been applied independent of thermal cycling effects to improve specific elements of adsorption process performance such as product purity or recovery or storage capacity. Distinct materials have been combined physically (co-mixture) in an adsorber or have been integrally bound in a single composite bead or pellet.

Mixtures of adsorbents have also been utilized when multiple separations are required. An example is provided in U.S. Pat. No. 4,194,892 A for the purification of steam reformer hydrogen involving the removal of carbon dioxide, methane and carbon monoxide using a rapid pressure swing adsorption (RPSA) process. It was shown that product $H_2$ recovery was increased when a homogeneous mixture of activated carbon and crystalline molecular sieve was used in place of activated carbon alone.

In U.S. Pat. No. 5,779,767 A is described the use of an adsorbent mixture of a zeolite and an alumina to separate carbon dioxide, water and acetylene from a feed gas.

In U.S. Pat. No. 6,027,548 A is described a process for purifying a gas stream using a combination of a strong adsorbent such as NaX or NaY and a comparatively weak adsorbent, such as $Al_2O_3$. These adsorbents are used to separate relatively heavy components such as carbon dioxide from relatively light components, such as nitrogen.

Mixtures of fine and coarse particles have been applied to reduce interparticle void space, increase adsorbent density and increase gas storage capacity. EP 0 325 392 B1 (Kaplan et al.) provides an example of this methodology applied in PSA systems employing carbon molecular sieve (CMS) adsorbents for kinetic separation of air to produce $N_2$. In Kaplan, the main CMS adsorbent is comprised of coarse particles (2.5 to 3.0 mm), while the void space between these larger particles is filled with fine particles of either an inert material or CMS adsorbent. The fine particle fraction is preferred to be an inert or non-adsorptive material (e.g. glass beads) and to occupy approximately 40% by volume of the adsorber bed. The reduction in void space was shown to improve process efficiency.

U.S. Pat. No. 4,499,208 A (Fuderer) doped activated carbon with inert dense alumina and achieved a reduced thermal swing when adsorbing $C_2$ at high pressure from a feed stream containing $H_2$, $CO_2$, CO and $CH_4$. Although the specific heat of the alumina is nearly the same as the activated carbon, the high density of the inert material significantly increases the heat capacity per unit volume of the bed. Lowering the thermal swing in the process significantly improved the process recovery.

The use of PSA for removing $CO_2$ from air prior to separating air into its respective components by cryogenic air separation is described in numerous publications, e.g. U.S. Pat. Nos. 4,249,915 A and 4,477,264 A. Conventional processes employed a dual bed of alumina for water removal followed by a zeolite such as 13X for $CO_2$ removal. More recently, all alumina PSA systems have been proposed, as described in U.S. Pat. No. 5,232,474 A. The advantages of an all alumina system include lower adsorbent cost, vessel design which does not need screens to separate the two different adsorbents and better thermal stability in the adsorption vessel during blow down and repressurization. However, alumina adsorbents have been less efficient towards $NO_x$ removal.

Alumina is also used as an adsorbent in TSA and for this purpose it has been proposed to treat the alumina to form alkali metal oxides thereon to increase the adsorptive capacity of the alumina. U.S. Pat. No. 4,493,715 A teaches a method for removing $CO_2$ from olefin streams by contacting the feed gas with a regenerable, calcined adsorbent consisting of essentially from 1 to 6 wt-% of an alkali metal oxide selected from the group consisting of sodium, potassium and lithium on alumina. The adsorbent was prepared by contacting alumina with an alkali metal compound which is convertible to the metal oxide on calcination.

U.S. Pat. No. 4,433,981 A describes a process for removing $CO_2$ from a gaseous stream which comprises contacting the gas stream at a temperature up to about 300° C. with an adsorbent prepared by impregnation of a porous alumina with a sodium or potassium oxide. The corresponding oxide can be prepared by impregnation with a decomposable salt and calcining at a temperature of 350° to 850° C.

U.S. Pat. No. 3,557,025 A teaches a method for producing alkalized alumina which is capable of adsorbing $SO_2$. The adsorbent is prepared by selectively calcining the alumina, and contacting with an alkali or ammonium bicarbonate salt to form at least 30% by weight alkalized alumina having the empirical formula of $MAl(OH)_2CO_3$.

Those skilled in the art continue to search for adsorbents suitable for use in PSA processes which provide improved $CO_2$ adsorption capacity and which can be regenerated under PSA operating conditions. Moreover, those skilled in the art are searching for improved $CO_2$ adsorbents which can be used in PSA processes which are integrated with other processes wherein adsorption of $CO_2$ onto the adsorbent and regeneration of the adsorbent are accomplished at temperatures often substantially higher than ambient temperature.

Gas purification, more specifically air pre-purification, represents another class of adsorption separation processes where multiple adsorbents can be applied to improve process performance. The operation of cryogenic air separation plants requires large quantities of pretreated air. To prevent freezing and plugging of the primary heat exchanger, the concentration of contaminants such as $CO_2$ and $H_2O$ must be lowered to less than 1 ppm with the typical specification for $CO_2$ content of less than 0.1 ppm. In addition, the concentration of light hydrocarbons which have a low solubility in cryogenic liquids, such as acetylene, must be kept very low, typically less than 1 ppb, to prevent accumulation within the cryogenic distillation system. Currently both thermal swing adsorption (TSA) and pressure swing adsorption (PSA) are used in air prepurification applications.

TSA pre-purifiers use a relatively small amount of heated purge gas to regenerate the adsorption beds. The typical purge-to-feed ratio is 10 to 15%. TSA units are extremely effective at removing the major contaminants such as $CO_2$, $H_2O$ and most of the hydrocarbons from an air feed because such adsorbers usually employ strong adsorbents. Any CO and $H_2$ contained in the feed is generally carried over into the product. If it is necessary to remove the CO and $H_2$, a sequential oxidation of the CO and $H_2$ is carried out by catalytic conversion. The strong adsorbents used in TSA processes, such as 5A or 13X zeolite, require the large thermal driving forces available by TSA to affect adequate desorption. The operating adsorbate loadings and selectivities of the major contaminants on these strong adsorbents is such that $CO_2$ breaks through into the product stream before acetylene and most other hydrocarbons that are harmful to cryogenic air separation plant operation, e.g., $C_3$ through $C_8$ hydrocarbons.

The feed gas is usually chilled to minimize the water content of the feed, which in turn reduces the amount of adsorbent required. This saves money by increasing the loading on a given quantity of adsorbent. While the TSA process results in a relatively low purge-to-feed ratio, the inherent heating of the purge and chilling of the feed adds to both the capital and operating cost of the process.

PSA pre-purifiers use a near-ambient temperature purge to regenerate the adsorption beds. The reduced driving force that is available from pressure swing alone requires a weaker adsorbent (e.g. alumina), shorter cycles and higher purge-to-feed ratios compared to TSA processes in order to achieve adequate desorption of $H_2O$ and $CO_2$ contaminants. Typical purge-to-feed ratios are 40%–60% in PSA pre-purification.

The operating loadings of $H_2O$ on the weak adsorbents used in PSA may actually be larger than those for strong zeolites. Unfortunately, weak adsorbents such as activated alumina are unable to sufficiently retain light hydrocarbons such as acetylene in a reasonable size bed and $C_2H_2$ breaks through into the product stream ahead of $CO_2$. This leads to a potentially hazardous operating condition in a cryogenic air separation process. While the capital costs associated with a PSA pre-purifier are lower than those of a TSA, the overall power requirement can be higher. In particular, blowdown or depressurization losses increase power consumption in the PSA pre-purifiers, i.e. PSA units cycle much faster than TSA units, resulting in an increase in the frequency of blowdown loss steps.

In light of the above considerations, there is a need in the pre-purification art for a PSA adsorbent bed that possesses the favorable desorption characteristics of activated alumina and yet has the acetylene selectivity and loading associated with the stronger zeolites. In addition, there is a need to minimize blowdown losses in order to reduce operating power. The prior art has attempted to address some of these problems.

DE 30 45 451 A1 (Hitachi), discloses a two bed adsorbent system. The first adsorbent (13X) is used to adsorb high concentrations of both $H_2O$ and $CO_2$, thus suppressing the co-adsorption of nitrogen. The second adsorbent (activated alumina) does not co-adsorb nitrogen very strongly. The alumina is used to complete the $H_2O$ and $CO_2$ adsorption. By minimizing the nitrogen co-adsorption in the beds, blowdown losses during depressurization are likewise minimized. Removal of light hydrocarbons was not addressed.

U.S. Pat. No. 5,232,474 A (Jain) uses a layer of activated alumina followed by a layer of 13X. Here it is claimed that the activated alumina layer is used to adsorb all the $H_2O$ and the majority of the $CO_2$. The purpose of the downstream 13X layer is to remove hydrocarbons and residual $CO_2$ from the gas stream. Jain teaches that the 13X layer is not intended to remove large amounts of $CO_2$.

In addition to the prior art cited above that relates to bulk gas separation or air pre-purification processes, the prior art also offers several different methods of deployment of material mixtures, e.g. physically mixing at least two different materials, chemically bonding at least two different materials integrally in bead, pellet or granular form, and chemically bonding in preformed structures. Examples of simple physical mixtures of individual materials have already been cited above. The bonding of different materials in a single adsorbent particle or preformed structure typically involves steps of wet mixing, curing, drying and activation. The final composite product may perform better than the average of its individual components. This performance enhancement has not always been well understood, but such improvements have often been attributed to increased surface area and/or activity resulting from the have often been attributed to increased surface area and/or activity resulting from the processing of the mixture. In essence, these mixtures or composites represent a new adsorbent with improved physical properties.

It is therefore an object of the invention to provide a PSA system and process that reduces the cost of adsorption processes employing high performance, high cost adsorbents. This objective is supported by improving adsorbent efficiency and/or by reducing the cost of the adsorbent. Improved adsorbent efficiency means greater adsorbent effectiveness for the desired separation.

It is a further object of the invention to provide a safe, flexible PSA pre-purification process and system that ensures more efficient removal of contaminants with a lesser power requirement as compared to existing prior art systems.

Applicant has developed an improved adsorbent which can remove multiple contaminants from various streams. Surprisingly these contaminants can be removed with only a small temperature rise and the adsorbent has increased stability upon multiple regenerations. This adsorbent comprises a zeolite, alumina and a metal component which is present in an amount of at least 10 mol-% of the stoichiometric amount of metal (expressed as the oxide) needed to compensate for the negative charge of the zeolite lattice.

SUMMARY OF THE INVENTION

This invention relates to a solid shaped adsorbent, a process for preparing the adsorbent and a process for removing contaminants from an air stream using the adsorbent.

The present invention relates to a process for removing contaminants from streams comprising contacting the stream with a solid shaped adsorbent, at adsorption conditions to remove at least a portion of at least one contaminant, the adsorbent comprising an alumina component, a zeolite component and a metal component, the metal component present in an amount at least 10 mol-% of the stoichiometric amount of metal needed to compensate for the negative lattice charge of the zeolite expressed as the oxide.

These and other objects and embodiments will become clearer after the following detailed description of the invention.

DETAILED DESCRIPTION OF THE INVENTION

The present invention comprises a solid shaped adsorbent, a process for preparing the adsorbent and purification processes using the adsorbent. With regard to the solid shaped adsorbent, one necessary component is an activated alumina. Activated aluminas include aluminas having a surface area usually greater than 100 $m^2/g$ and typically in the range of 100 to 400 $m^2/g$. The activated alumina powder is preferably obtained by rapid dehydration of aluminum hydroxides, e.g., alumina trihydrate of hydrargillite in a stream of hot gases or solid heat carrier. Dehydration may be accomplished in any suitable apparatus using the stream of hot gases or solid heat carrier. Generally, the time for heating or contacting with the hot gases is a very short period of time, typically from a fraction of a second to 4 or 5 seconds. Normally, the temperature of the gases varies between 400° and 1000° C. The process is commonly referred to as flash calcination and is disclosed, for example in U.S. Pat. No. 2,915,365 A, incorporated herein by reference. However, other methods of calcination may be employed.

The activated aluminas suitable for use in the present invention have a median particle size in the range of 0.1 to 300 microns, preferably 1 to 100 microns and typically 1 to 20 microns. In certain instances, it may be desirable to use aluminas with a median particle size of 1 to 10 microns. The alumina may be ground to the desired particle size before or after activation. The activated alumina typically has an LOI (loss on ignition) in the range of about 5 to 12% at a temperature of 200° to 1000° C.

One source of activated alumina is gibbsite which is one form of alumina hydrate derived from bauxite using the Bayer process. However, alpha alumina monohydrate, pseudoboehmite or the alumina trihydrate may be used if sufficiently calcined. Other sources of alumina may also be utilized including clays and alumina alkoxides.

Another necessary component of the present invention is a zeolite. Zeolites are crystalline aluminosilicate compositions which are microporous and which have a three-dimensional oxide framework formed from corner sharing $AlO_2$ and $SiO_2$ tetrahedra. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. The zeolites which can be used in the present invention are those which have a pore opening of about 5 to about 10 Å.

In general, the zeolites have a composition represented by the empirical formula:

$$M_{2/n}O:Al_2O_3:b\ SiO_2$$

M is a cation having a valence of "n" and "b" has a value of about 2 to about 500. Preferred zeolites are those that have a $SiO_2/Al_2O_3$ ratio of about 2:1 to about 6:1 and/or those having the crystal structure of zeolite X, faujasite, zeolite Y, zeolite A, mordenite, beta and ferrierite. Especially preferred zeolites are zeolites X, Y and A.

Preparation of these zeolites is well known in the art and involves forming a reaction mixture composed of reactive sources of the components which mixture is then hydrothermally reacted to form the zeolite. Specifically, the synthesis of zeolite Y is described in U.S. Pat. Nos. 3,130,007 A and 4,503,023 A and that of zeolite X in U.S. Pat. Nos. 2,882,244 A and 3,862,900 A, the disclosures of which are incorporated by reference.

Although the synthesis of zeolites, and zeolites X and Y in particular, are well known, a brief description will be presented here for completeness. Reactive sources of M include the halide and hydroxide compounds of alkali or alkaline earth metals such as sodium chloride, sodium hydroxide, potassium hydroxide, etc. Aluminum sources include but are not limited to boehmite alumina, gamma alumina and soluble aluminates such as sodium aluminate or tetraethylammonium aluminates. Finally, silicon sources include, silica, silica hydrosol, silicic acid, etc.

The reactive sources are combined into a reaction mixture which has a composition in terms of mole ratios of the oxides of:

$SiO_2/Al_2O_3 = 8:12$ $M_2O/Al_2O_3 = 2.5:4$ $H_2O/M_2O = 120:180$ and the mixture is then reacted to form the zeolite.

As synthesized, the zeolites will contain "M" metals in the channels and/or pores. The function of these metal cations is to balance the negative charge of the zeolite lattice. Since these cations are not part of the framework, they are exchangeable and are said to occupy exchange sites. The amount of metal cations present in the zeolite is referred to as the stoichiometric amount or the maximum ion exchange capacity of the zeolite. This amount is usually expressed in moles.

Since the metal cations initially present in the zeolite are exchangeable they can be exchanged for other (different) alkali metals, alkaline earth metals, hydronium ions, ammonium ions or mixtures thereof. If the zeolite to be used contains partially or completely hydronium or ammonium ions, then these ions must be fully exchanged with alkali metals, alkaline earth metals or mixtures thereof, either before or during the preparation of the composite adsorbent.

Another necessary component of the shaped adsorbent of this invention is a metal component selected from the group consisting of alkali, alkaline earth metals and mixtures thereof. This metal component is in addition to the metal cation (M) present in the exchange sites of the zeolite. Additionally, the metal can be the same or different than the (M) metal. For example, the metal component in a zeolite can be potassium whereas the metal can be sodium.

Specific examples include but are not limited to sodium, potassium, lithium, rubidium, cesium, calcium, strontium, magnesium, barium, zinc and copper. The source of the metal component (metal component precursor) can be any compound which at activation conditions, (see infra) decomposes to the metal oxide. Examples of these sources are the nitrates, hydroxides, carboxylates, carbonates and oxides of the metals. The shaped adsorbent can be prepared by combining the three components in any order and forming into a shaped article although not necessarily with equivalent results.

In one method, the alumina, zeolite and an aqueous solution of the desired metal compound are mixed and formed into a shaped article. For example, gamma alumina, zeolite X and a solution of sodium acetate can be combined into a dough and then extruded or formed into shapes such as pellets, pills, tablets or spheres (e.g. by the oil drop method) by means well known in the art. A preferred method of forming substantially rounded shapes or bodies involves the use of a pan nodulizer. This technique uses a rotating pan or pan nodulizer onto which is fed the alumina component, zeolite component and a solution of the metal component thereby forming substantially rounded articles or bodies.

Another method of forming the shaped article is to mix powders of the alumina, zeolite and metal compound followed by formation of pellets, pills, etc. A third method is to combine the alumina and zeolite components (powders), form them into a shaped article and then impregnate the shaped article with an aqueous solution of the metal compound. The forming step is carried out by any of the means enumerated above.

In preparing a solution of the desired metal compound, it is preferred to adjust the pH to a value from about 7 to about 14, more preferably from about 12 to about 14 and most preferably from about 12.7 to about 13.8. The pH of the solution is controlled by adding the appropriate amount of the desired metal hydroxide. For example, if sodium is the desired metal, sodium acetate can be used to form the aqueous solution and the pH is then adjusted using sodium hydroxide.

Having obtained the shaped articles, they are cured or dried at ambient temperature up to about 200° C. for a time of about 5 minutes to about 25 hours. The shaped articles can be cured in batches e.g. bins or trays or in a continuous process using a moving belt. Once the shaped articles are cured, they are activated by heating the cured articles at a temperature of about 275° to about 600° C. for a time of about 5 to about 70 minutes. The heating can be done with the articles in a moving pan or in a moving belt where the articles are fired to provide the finished solid adsorbent.

The relative amount of the three components can vary considerably over a wide range. Usually the amount of alumina varies from about 40 to about 90% of the adsorbent and the amount of zeolite varies from about 5 to about 55 wt-% of the adsorbent. The amount of metal component can also vary considerably, but must be present in an amount equal to at least 10% of the stoichiometric amount of the metal cation, M, present in the exchange sites of the zeolite. For practical reasons, the maximum amount of the metal component should be no more than 50% of the stoichiometric amount of M. In absolute terms, it is preferred that the amount of metal component be present from about 0.015 to about 0.08 gram moles of metal per 100 gm of adsorbent. The amounts of metal are reported or expressed as the oxide of the metal, e.g. $Na_2O$.

The streams are purified by contacting the stream with the solid adsorbent at adsorption conditions. The contacting can be carried out in a batch or continuous process with continuous, being preferred. The adsorbent can be present as a fixed bed, moving bed or radial flow bed with fixed bed being preferred. When a fixed bed is used, the feed stream can be flowed in an upflow or downflow direction, with upflow being generally preferred. If a moving bed is used, the feed stream flow can be either co-current or counter-current. Further, when a fixed bed is used, multiple beds can be used and can be placed in one or more reactor vessel. Adsorption conditions include a temperature of about ambient to about 80° C. and a pressure of about atmospheric to about 100 atm. ($1.01 \times 10^4$ kPa). The gas hourly space velocity varies from about 500 to about 10,000 $hr^{-1}$.

After a certain amount of time, which time depends on the concentration of contaminants, the size of the bed and the space velocity, the adsorbent will be substantially spent, i.e. has adsorbed an amount of contaminant(s) such that the level of contaminant in the purified stream is above an acceptable level. At this time, the adsorbent is regenerated. The spent adsorbent can be regenerated by means well known in the art and then placed back on service. Other variations of a PSA process or combination with TSA or vacuum swing adsorption processes may be employed as found to be useful in the practice of the present invention.

The following examples are set for in order to more fully illustrate the invention. It is to be understood that the examples are only by way of illustration and are not intended as an undue limitation on the broad scope of the invention as set forth in the appended claims.

EXAMPLE 1

Balls containing alumina, zeolite 13X and sodium were prepared as follows. A rotating pan device was used to continuously form beads by simultaneously adding activated alumina powder (AP) and zeolite 13X powder (Z) while spraying the powders with a sodium acetate solution (NaAc). The mass ratio (on a volatile free basis) was 1.0 AP:0.23 Z:0.04 NaAc. Water was added as needed to keep the sodium acetate dissolved and to provide for sufficient agglomeration. The pH of the NaAc solution was adjusted to 13.3 by adding a NaOH solution. The balls, which had a size distribution from 1.2 to 4 mm were cured at 60° to 80° C. for three hours using a heated belt. Finally, the cured beads were activated in an oven at about 450° C. for one hour. The amount of each component (wt-%) on a volatile free basis was found to be 78.7% AP; 18.1% Z; 3.2% $Na_2O$.

EXAMPLE 2

The procedure set forth in Example 1 was used to prepare balls except that the mass ratio of AP:Z:NaAc was 1.0:0.55:0.035. The amount of each component (wt-%) on a volatile free basis was found to be 63.1% AP; 34.7% Z; 2.2% $Na_2O$.

EXAMPLE 3

The procedure set forth in Example 1 was used to prepare balls except the mass ratio of AP:Z:NaAc was 1.0:0.37:0.05. The amount of each component (wt-%) on a volatile free basis was found to be 70.4% AP; 26.1% Z; 3.5% $Na_2O$.

EXAMPLE 4

The procedure in Example 3 was used to prepare balls except that water was used instead of NaAc. The amount of each component (wt-%) on a volatile free basis was found to be 72.9% AP; 26.9% Z; 0.2% $Na_2O$.

EXAMPLE 5

The process of Example 1 was carried out except that zeolite NaY (obtained from UOP LLC) was used instead of zeolite 13 X and the ratio was 1AP:0.37Z. The amount of each component (wt-%) on a volatile free basis was found to be 72.9% AP; 26.9% Z; 0.2% $Na_2O$.

EXAMPLE 6

In a rotating container there were placed 500 g of the balls from Example 5 and 200 g of a 4.6 wt-% sodium acetate solution. The balls were cured by rotating the closed container for one hour and then activated as per Example 1. The amount of each component (wt-%) on a volatile free basis was found to be 72.36% AP; 26.7% Z; 0.94% $Na_2O$.

EXAMPLE 7

Balls were prepared as in Example 6 except that a solution containing 10.9 wt-% sodium acetate was used. The amount of each component (wt-%) on a volatile free basis was found to be 71.65% AP; 26.44% Z; 1.91% $Na_2O$.

EXAMPLE 8

Balls were prepared as in Example 6 except that a solution containing 17.1% sodium acetate was used. The amount of each component (wt-%) on a volatile free basis was found to be 70.9% AP; 26.18% Z; 2.88% $Na_2O$.

EXAMPLE 9

Adsorbents prepared in accordance with the process of Example 1 were found to adsorb more carbon dioxide than control composites that contained only zeolite and alumina and no additional alkali.

What is claimed is:

1. A process for removing contaminants from air streams comprising contacting the stream with a solid shaped adsorbent, at adsorption conditions to remove at least a portion of at least one contaminant, the adsorbent comprising an alumina component, a zeolite component and a metal component, the metal component present in an amount at least 10 mol-% of the stoichiometric amount of metal needed to compensate for the negative lattice expressed as the oxide charge of the zeolite, wherein said adsorbent has been activated by heating at a temperature of from about 275° to about 600° C. for a time of about 5 to about 70 minutes.

2. The process of claim 1 wherein said adsorption is part of a cyclic adsorption process selected from temperature swing adsorption, pressure swing adsorption, vacuum swing adsorption and combinations of these.

3. The process of claim 2 wherein said adsorption is part of a pressure swing adsorption process.

4. The process of claim 1 wherein the adsorption conditions include a temperature of about ambient to about 80° C. and a pressure of about atmospheric to about 100 atm.

5. The process of claim 1 wherein the contaminants comprise at least one contaminant selected from the group consisting of $CO_2$, $H_2O$ and $H_2S$, COS, $O_2$ and CO.

6. The process of claim 1 wherein the zeolite is selected from the group consisting of zeolite X, zeolite Y, zeolite A and mixtures thereof.

7. The process of claim 1 wherein the metal component is an alkali metal, an alkaline earth metal or a mixture thereof.

8. The process of claim 7 wherein said metal component is selected from the group consisting of sodium, potassium, lithium, rubidium, cesium, calcium, strontium, magnesium, barium, zinc, copper and mixtures thereof.

9. The process of claim 1 wherein the zeolite is present in an amount from about 5 to about 55 wt-% of the adsorbent.

10. The process of claim 1 wherein the metal component is present in an amount from about 0.015 to about 0.08 gram moles of metal as the oxide per 100 g of adsorbent.

* * * * *